Patented July 2, 1946

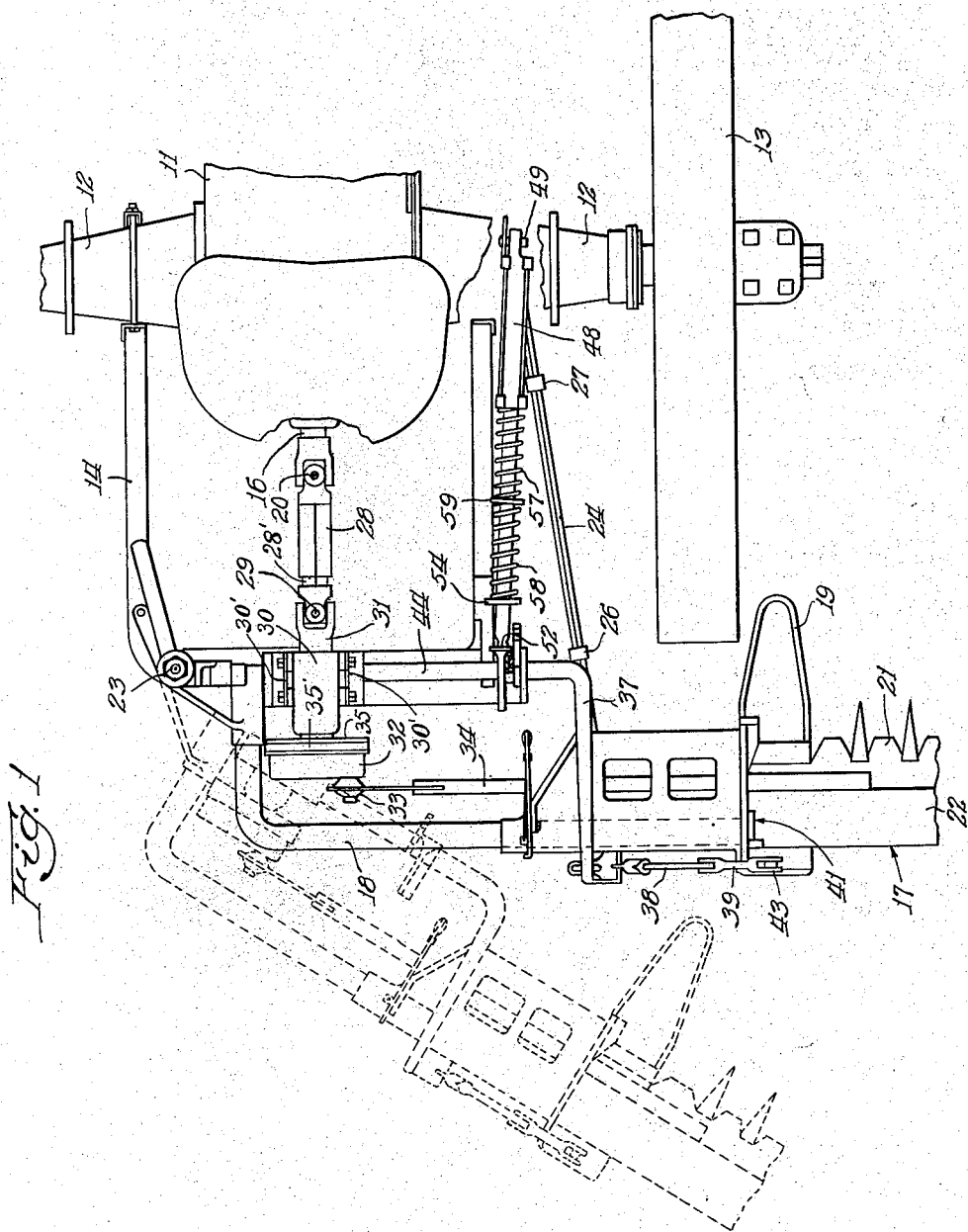

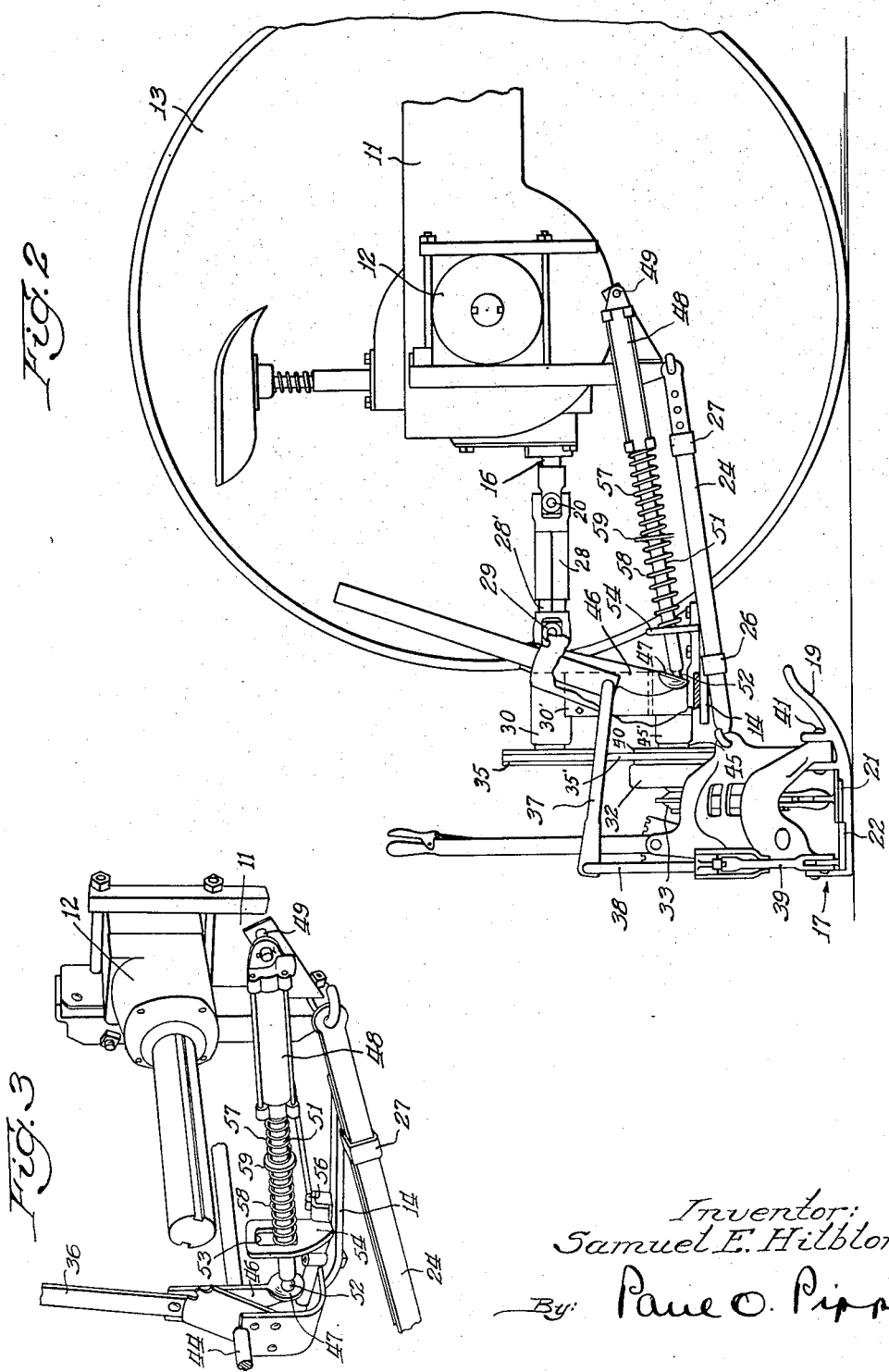

2,403,365

UNITED STATES PATENT OFFICE 2,403,365

MOWER

Samuel E. Hilblom, Chicago, Ill., assignor to International Harvester Company, a corporation of New Jersey Application July 26, 1943, Serial No. 496,105

11 Claims. (Cl. 56—25)

This invention relates to a new and improved implement such as a mower and has for one of its principal objects the provision of a mower capable of both horizontal and vertical movement and a hydraulic lift to actuate the vertical movement and means to permit the horizontal movement without disconnecting or otherwise interfering with the hydraulic lift for the vertical movement of the mower.

Numerous mowers have been equipped with these two ranges of movement, namely, horizontal and vertical, and an equal number of interlocking mechanisms have been employed on the mower to permit the one range of movement without interfering with the actuation of the other range of movement. It is, therefore, an object of the present invention to provide an improved interlocking device for enabling the hydraulic lift to move the mower through its vertical range of movement and still allow a rearward horizontal swinging of the mower upon striking an obstruction without actually unlocking anything, and, immediately upon the return of the mower to its normal operating position, the hydraulic lifting device may lift the mower vertically without the usual connecting of elements such as ordinarily accompany mowers of this type.

An important object of this invention is to maintain a combined hand- and power-operated lifting mechanism for mowers and means associated with said lifting means to permit swinging of the mower through a second range of movement without disconnecting anything or having to reconnect anything upon the return of the mower to its normal position in order to lift the mower either by hand or power.

Other and further important objects of this invention will become apparent from the following specification and accompanying drawings, in which:

Figure 1 is a top plan view of a tractor mower incorporating the novel features of this invention;

Figure 2 is a side elevational view of the mower shown in Figure 1; and

Figure 3 is a detail perspective view of the mower lifting elements shown attached to the tractor, portions of which have been removed for complete visibility of the lifting elements.

As shown in the drawings, the reference numeral 11 indicates generally a chassis of an agricultural tractor with rear axle housing 12, at the outer ends of which are mounted wheels 13, and a draw-bar 14 extending rearwardly of the tractor. The forward end of the tractor is not shown as it forms no part of the present invention. A power take-off 16 in the form of a square tube extends rearwardly of the tractor chassis 11 and acts to drive a mower 17, which comprises a frame member 18, a shoe 19, and a sickle or cutter-bar 21 adapted to reciprocate on the body portion 22 of the mower. The frame 18 of the mower 17 is hinged to the draw-bar 14 at 23 about which the mower 17 may be swung rearwardly in a horizontal plane. Upon such swinging rearwardly, a telescoping connecting link 24 attached to the axle housing 12 and to the mower 17, extends to its limiting position, as determined by the abutment of stops 26 and 27, thereupon limiting the rearward swinging of the mower 17. Normally, this telescoping member 24 holds the mower in its operating position, that is, extending outwardly from the side of the tractor until such time as it strikes an obstruction, whereupon the telescoping member 24 is released, allowing rearward swinging of the mower to save the latter from damage.

The drive for the mower cutter-bar 21 is taken from the rotary power take-off shaft 16 through a first universal joint 20 which is joined by square telescoping shaft members 28 and 28' to a second universal joint 29. The universal joints 20 and 29 and the included telescoping square shafting 28 and 28' enable the mower to swing rearwardly and still maintain a driving engagement with the power take-off 16. The drive continues rearwardly through a shaft 31, which is journaled for rotation in a bearing 30, to a pulley 35. The bearing 30 is supported by vertically positioned brackets 30' extending upwardly from and supported on the tractor draw-bar 14. A V-belt 35' driven by the pulley 35 proceeds downwardly to drive a pulley 40 keyed or otherwise attached to a shaft 45 journaled in a bearing 45'. A fly-wheel 32 also attached to the driven shaft 45 drives a pitman 33 to cause reciprocation of a connecting arm 34 associated with the cutter-bar 21. Similar mower drives are shown in my prior Patents 2,314,215 and 2,314,216.

The cutter-bar 21 and body portion 22 are liftable vertically when it is desired to transport the tractor or raise or lower the cutter-bar, depending on the angle of highway shoulder or other ground being mowed. The cutter-bar is lifted vertically by means of a lever 36 through suitable linkage 37, 38, and 39. The entire mower including the frame 18 does not lift vertically, but rather the cutter-bar 21 is hinged in the usual way at its inner end at 41, so that, when the upper end of the lever 36 is moved forwardly, the lever arm 37 is raised, causing the connecting links 38 and 39 to also raise, and, inasmuch as the lower end of the link 39 is attached to the mower body 22 at 43, the cutter-bar 21 is lifted about the hinge 41. The lever 36, as shown in Figure 3, is keyed to a shaft-like extension 44 of the lever arm 37. This rock-shaft 44 is carried on the mower frame 18, and, upon rearward swinging of the mower 17, the rock-shaft 44 likewise moves rearwardly about the hinge member 23.

A downwardly depending lever arm 46 secured to the lever 36 is equipped at its lower end with a cup-shaped member 47, as best shown in Figure 3. A hydraulic or fluid-actuated power-lift cylinder 48 is hingedly connected to the tractor at 49. This cylinder 48 is equipped with a reciprocating piston-actuated rod 51, which has a ball-shaped element 52 at its end adapted to be received loosely in the cup-shaped socket 47 of the downwardly depending lever arm 46. It will be seen that an outward extension of the piston 51 from its cylinder 48 will cause the lever arm 46 to be pushed rearwardly, and, inasmuch as it is integral with the lever 36, the lever arm 37 will be swung upwardly in a manner similar to that caused by a forward movement of the upper part of the lever 36. The piston rod 51 is movable vertically in a slot 53 formed in a bracket 54 fastened to the draw-bar 14 at 56. A pair of springs 57 and 58 surround the piston rod 51 and are separated by a washer-like member 59, which is affixed to the piston rod 51. The spring 57 acts to normally extend the piston rod 51, and the spring 58 acts to normally counteract such extension of the piston rod 51. As the lever arm 46 moves rearwardly, it will be seen that it forms an arc about the shaft 44, and as it progresses rearwardly, the cup-shaped socket 47 at its lower end rises, thereby necessitating the piston rod 51 and its ball-shaped end 52 to likewise rise in order to properly engage the cup 47. The rising of the piston is accomplished by the hinging of the power cylinder 48 at 49 and movement of the piston rod 51 upwardly through the guide slot 53.

As previously stated, when the mower 17 swings rearwardly, the shaft 44 likewise moves rearwardly, and therefore the upwardly extending lever 36 and the depending lever 46 likewise move with the shaft 44. The power unit 48 and its associated piston rod 51 remain with the tractor and do not shift rearwardly upon rearward movement of the mower, and therefore a means must be provided between the power unit and the movable part of the mower to enable the mower to be lifted vertically whenever the mower is in its normal operating position. The present ball and socket joint, capable of readily separating and automatic alinement upon bringing the mower to its operating position after having swung rearwardly, is the solution to this problem. Heretofore, the power lifting devices employed on tractor mowers of this type have been adapted to pull a cable over sheaves, or the like, to cause lifting of the mower with respect to the tractor, and in such construction it has been necessary to provide break-away means for such cable connections and a refastening of these connecting elements upon bringing the mower to its operating position.

It will be apparent that herein is provided a novel tractor mower which permits the mower to move both horizontally and vertically with respect to the tractor and yet does not require a complicated interconnecting means to enable the mower to be released rearwardly through its horizontal movement upon striking an obstruction or the like. A ball and socket connection is provided in this case, as shown at 52 and 47, which is readily separable or breakable and is always in alinement upon bringing of the mower to its operating position.

The construction of this tractor mower may take numerous forms and still incorporate the novelty of this invention, and, therefore, it is not proposed to limit the patent granted hereon otherwise than as necessitated by the prior art.

What is claimed is:

1. In a mower having a support and a cutter-bar connected thereto for movement through horizontal and vertical ranges, means for directly raising the cutter-bar vertically, said means comprising a lever hinged on said support and arranged to lift said attachment upon swinging movement thereof, said lever having a cup-shaped socket at one end thereof and a push rod having a ball-shaped end adapted to loosely and separably engage the cup-shaped socket, whereby the mower bar is permitted horizontal movement without any hindrance from the separable ball and socket connection for the vertical movement of the mower.

2. In a tractor-mounted mower movable both horizontally and vertically with respect to the tractor, a power unit on the tractor having a reciprocable piston, and a lever hinged on the mower adapted to directly lift the mower vertically, said piston in alinement with and adapted to engage and tilt said lever, whereby the mower may be moved horizontally rearwardly and returned to operating position with the piston and lever remaining in alinement.

3. In a tractor-mounted mower having a cutter-bar movable both horizontally and vertically with respect to the tractor, a lever hinged for swinging movement on the mower and arranged to cause vertical swinging movement of said cutter-bar with respect to the mower, a downward extension of said lever having a cup-shaped bottom, and a power-operated piston associated with said tractor and adapted to be positively alined with said cup-shaped lever bottom when the cutter-bar is in its normal operating position, whereby when the cutter-bar is moved rearwardly the cup and piston separate and when the cutter-bar is returned to operating position the piston and cup are again operatively alined so that when the piston is extended the cutter-bar is raisable thereby.

4. In a tractor mower having a frame and a cutter-bar hinged thereto for vertical swinging movement, a fluid cylinder on the tractor, a piston selectively extended or withdrawn in said cylinder, said piston having a ball-shaped end, and a lever hinged on said frame for effecting the vertical swinging of said cutter-bar, said lever having an open cup-shaped socket whereby upon extension of said piston and engagement of said ball-shaped end with said socket on the lever the cutter-bar is raised.

5. In a tractor mower having at least two ranges of movement, a hydraulic cylinder having a reciprocating piston, said piston having a ball-shaped end, the mower having a frame hinged to the tractor for horizontal swinging, a cutter-bar hinged to said frame for vertical movement, and a lever hinged on the mower frame for directly lifting said cutter bar, said lever having a cup-shaped socket on a depending portion thereof adapted to loosely receive the ball-shaped end of the piston whereby upon extension of said piston the cutter-bar is raised.

6. In a tractor mower having at least two ranges of movement, a hydraulic cylinder having a reciprocating piston, said piston having a ball-shaped end, the mower having a frame hinged to the tractor for horizontal swinging, a cutter-bar hinged to said frame for vertical movement, a lever on the mower frame for lifting said cutter bar, said lever having a cup-shaped socket on a depending portion thereof adapted to loosely receive the ball-shaped end of the piston, and means for releasing the mower frame for rearward horizontal swinging, whereby the cup-shaped socket is also moved rearwardly and upon return of the mower frame to its operating position, the ball and piston and the cup-shaped socket are in operative relationship whereupon extension of the piston causes the ball to engage the socket and so raise the cutter-bar.

7. In a tractor mower having at least two ranges of movement, a hydraulic cylinder having a reciprocating piston, said piston having a ball-shaped end, the mower having a frame hinged to the tractor for horizontal swinging, a cutter-bar hinged to said frame for vertical movement, and a lever on the mower frame for lifting said cutter-bar, said lever having a cup-shaped socket on a depending portion thereof adapted to loosely receive the ball-shaped end of the piston, said lever having an upward extension whereby the cutter-bar may be raised either by manual operation of the upward extension or by the hydraulic cylinder piston ball end acting against the cup-shaped socket of the depending portion of the lever.

8. In a tractor having a mower mounted for operative cutting position at one side thereof, said mower comprising a frame and a cutter-bar hinged for vertical movement with respect to each other, said frame hinged to said tractor for horizontal movement, a lever arm on said frame, linkage associated with said lever arm for raising and lowering the cutter-bar, power means on the tractor for actuating said lever, said power means comprising a hydraulic cylinder with a controlled reciprocating piston, a ball-shaped end on said piston and an openly flared socket on a depending portion of said lever arm, and means for maintaining the piston ball end in alinement with said socket when the mower is in operative cutting position, whereby the mower may be swung horizontally rearwardly and returned to operative cutting position and upon an extension of said piston the ball will engage the socket on the lever and raise the cutter-bar.

9. In a tractor having a mower mounted for operative cutting position at one side thereof, said mower comprising a frame and a cutter-bar hinged for vertical movement with respect to each other, said frame hinged to said tractor for horizontal movement, a lever arm on said frame, linkage associated with said lever arm for raising and lowering the cutter-bar, power means on the tractor for actuating said lever, said power means comprising an hydraulic cylinder with a controlled reciprocating piston, a ball-shaped end on said piston and an openly flared socket on a depending portion of said lever arm, and means for maintaining the piston ball end in alinement with said socket when the mower is in operative cutting position, whereby the mower may be swung horizontally rearwardly and returned to operative cutting position and upon an extension of said piston, the ball end will engage the socket on the lever and raise the cutter-bar, said means for maintaining the piston ball end in alinement with said socket comprising a bracket affixed to the frame and having a vertical slot therein through which the piston passes.

10. In a tractor having a mower mounted for operative cutting position at one side thereof, said mower comprising a frame and a cutter-bar hinged for vertical movement with respect to each other, said frame hinged to said tractor for horizontal movement, a lever arm on said frame, linkage associated with said lever arm for raising and lowering the cutter-bar, power means on the tractor for actuating said lever, said power means comprising a hydraulic cylinder with a controlled reciprocating piston, a ball-shaped end on said piston and an openly flared socket on a depending portion of said lever arm, and means for maintaining the piston ball end in alinement with said socket when the mower is in operative cutting position, whereby the mower may be swung horizontally rearwardly and returned to operative cutting position and upon an extension of said piston, the ball will engage the socket on the lever and raise the cutter-bar, said means for maintaining the piston ball end in alinement with said socket comprising a bracket affixed to the frame and having a vertical slot therein through which the piston passes, and said lever arm having an upward extension for manual operation thereof.

11. In a tractor having a mower mounted for operative cutting position at one side thereof, said mower comprising a frame and a cutter-bar hinged for vertical movement with respect to each other, said frame hinged to said tractor for horizontal movement, a lever arm on said frame, linkage associated with said lever arm for raising and lowering the cutter-bar, power means hinged on the tractor for actuating said lever, said power means comprising a hydraulic cylinder with a controlled reciprocating piston, a ball-shaped end on said piston and an openly flared socket on a depending portion of said lever arm, and means for maintaining the piston ball end in alinement with said socket when the mower is in operative cutting position, whereby the mower may be swung horizontally rearwardly and returned to operative cutting position and upon an extension of said piston, the ball will engage the socket on the lever, thus tilting the lever and raising the cutter-bar, said means for maintaining the piston ball end in alinement with said socket comprising a bracket affixed to the frame and having a vertical slot therein through which the piston hingedly swings.

SAMUEL E. HILBLOM.